July 10, 1956 — E. W. CARR ET AL — 2,753,889
CAR-END VALVE
Filed April 22, 1953 — 2 Sheets-Sheet 2
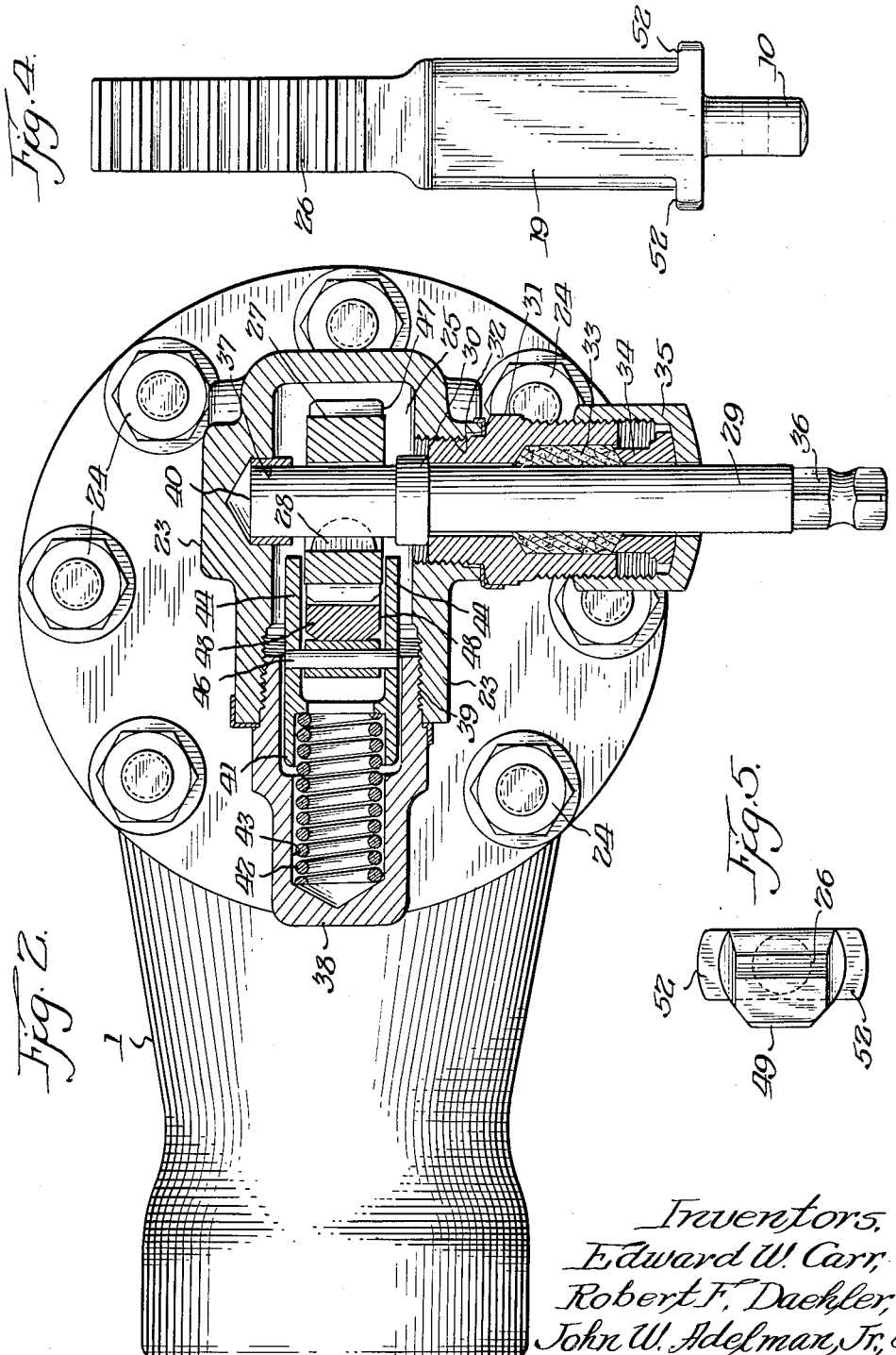
Inventors,
Edward W. Carr,
Robert F. Daehler,
John W. Adelman, Jr., &
George E. Hansen.
By Joseph O. Lange
Atty.

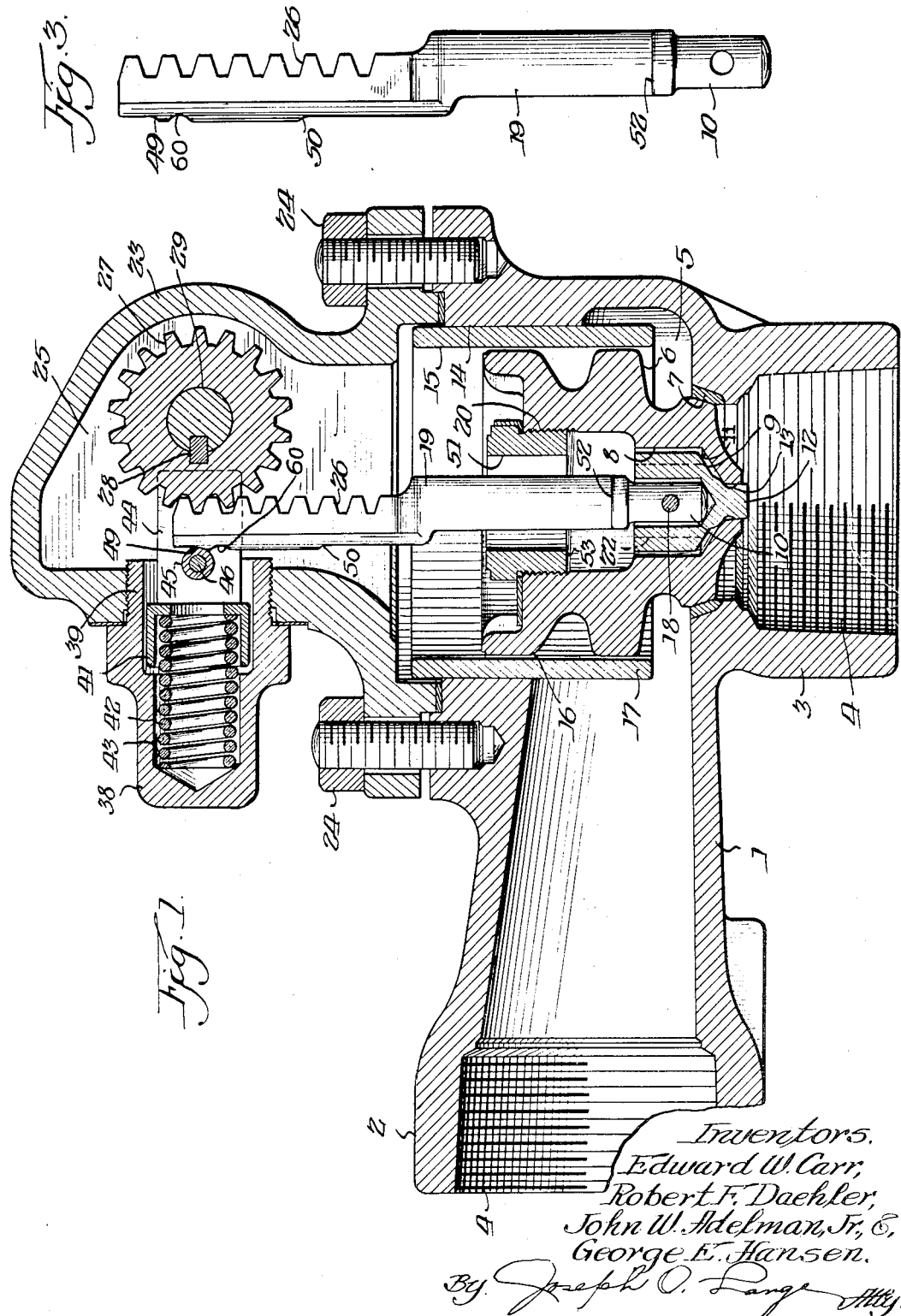

United States Patent Office 2,753,889
Patented July 10, 1956

2,753,889

CAR-END VALVE

Edward W. Carr, Cicero, Robert F. Daehler, La Grange, John W. Adelman, Jr., Chicago, and George E. Hansen, Elmwood Park, Ill., assignors to Crane Co., Chicago, Ill., a corporation of Illinois Application April 22, 1953, Serial No. 350,347

7 Claims. (Cl. 137—630.15)

This invention relates to valves, and more particularly, it is concerned with the type of valve referred to by those who are skilled in the art as a car steamheat end valve.

Specifically, this invention has for its principal object the provision of a more effective means for rendering improved operation and performance of valves of this type on severe services. Heretofore, one of the main objections to these valves has been the inability of obtaining accurate and easy alignment of certain essential working parts constituting the valve actuating mechanism and thereby leading to early failures.

Another object of this invention is to provide for a valve structure in which the usual actuating load is more generally and evenly distributed over a substantially larger area and thereby minimizes the usual expensive wear occurring on a number of said working parts of the actuating mechanism.

Other objects and advantages of this contribution to the valve actuating art will become more readily apparent upon proceeding with a description of a preferred form of the device read in light of the accompanying drawings in which Fig. 1 is a sectional assembly view of a preferred embodiment of our invention.

Fig. 2 is a transverse sectional view taken at an upper portion of Fig. 1.

Fig. 3 is a side view of the novel operating rack employed.

Fig. 4 is a front view of the rack referred to in Fig. 3.

Fig. 5 is a plan view of the said rack.

Similar reference numerals refer to similar parts throughout the several views.

Referring now to Fig. 1, a valve body or casing 1 is shown which is provided with the usual inlet connection 2 and the outlet 3 for effecting the conventional attachment to a pipeline (not shown). Each of the latter openings is provided with the usual pipe threads 4 for attachment to the pipeline. Within the valve chamber 5, a main valve disc or closure member 6 is positioned contacting as at 7 a casing seat which may be either separately applied as illustrated or which may be made integral with the casing or body 1. Within the hollow chamber 8 of the main valve closure member, a pilot disc 9 is mounted and as indicated, is relatively closely guided within the chamber 8, seats as at 11 around the rack portion 10 on the lower annular interior of the main valve closure member 6, and preferably having a guiding throttling lip 12 fitted within the lower aperture 13 of the said main valve closure member. As indicated, the valve chamber 5 is preferably, but not necessarily, fitted with a main disc liner 14 bored out as at 15 to receive the annular projecting portions 16 and 17 on the main valve closure or disc.

Attached to the pilot disc 9 and in pinned relation, as at 18, the lower end portion 10 of the reciprocally movable rack 19 is attached. Thus, the chamber 8 serves to receive the combined end portion of the rack 19 and the pilot disc 9, the latter being suitably fluted as at 22 on its outer periphery to allow for the fluid flow therepast when in the open or bleed position.

At its upper portion, the body or casing 1 is fitted with a cap or bonnet 23 attached in the conventional manner by means of the bolts and studs 24 in fluid sealing relation to the body or casing 1, the bolts being annularly distributed as indicated in the plan view of Fig. 2. Immediately above the bolted connection, the bonnet is provided with a chamber 25 for receiving the upper actuating mechanism for the rack 19, the latter member having the gear teeth 26 for engagement with the rotatable pinion 27. The latter member is mounted by means of the key 28 in non-rotatable relation to the transversely extending shaft 29. The latter member is provided with a stop shoulder 30 and is mounted within the stuffing box 31, threadedly attached as at 32, as shown more clearly in Fig. 2. The stuffing box 31 is provided with the conventional packing 33 and the usual gland and stuffing nut 34 and 35 respectively. An outer end portion of the stem or shaft 29 is provided with a square or polygonal portion 36 to receive the usual operating handle (not shown) for effecting rotatability. It will therefore be understood that the rotation of the pinion 27 in a clockwise direction when viewed as shown in Fig. 1 will cause the rack 19 to be moved reciprocatingly upwardly from the lowermost or seated position as indicated. At its innermost end limit, the shaft 29 is journalled in the usual manner in the renewable bushing 37 (see Fig. 2).

Thus far, the actuating mechanism described is conventional and follows in general the outline of the operation and structure set forth in patent application Serial No. 236,805, filed July 14, 1951, now Patent No. 2,693,-825, November 9, 1954.

A novel detainer mechanism and mounting therefor is hereinafter set forth in detail which constitutes the gist of this invention.

As shown more clearly in Fig. 1, a detent cover member 38 is mounted in transverse relation to the casing cap or cover member 23 so as to engage as at the threaded shank 39 the upper side portion of the said cap. A bifurcated holder 41 is held in preferably resilient relation by means of the spring 42 mounted within the chamber 43 of the detent cover 38. The bifurcated portion of the roller holder member 41 is provided with the extensions or side arms 44, the latter portions engaging for guidance both sides of the said pinion gear 27. The latter guide arrangement thus positively positions the roller member 45 which is mounted on the axle 46 between the bifurcated portions 44 of the roller holding member 41 on a vertical plane for providing accurate alignment therebetween. As shown more clearly in Fig. 2, the sides of the gear teeth on the pinion 27 are preferably undercut as at 47 below the depth of each tooth and thus eliminates the objection of burring or upsetting the pinion teeth by their contact with the guide arms 44 when the valve is being opened or closed. It will also be noted that the latter guide members are made of a length sufficient to permit the interposition between the roller and the teeth of the rack 19 to be mounted so that the side surface portions 48 of the rack 19 are likewise contacted by the guide arms 44. This additionally insures alignment of the roller holder member 41 respectively with the reciprocating rack member 19, the pinion 27 in a horizontal position and with the said rack also being suitably guided in a vertical plane. This constitutes an important mechanical advantage over any means heretofore provided in an actuating mechanism. It will be clear that the roller 45 is at all times in the same vertical plane as the rack 19 because of the guiding influence provided by the arms 44. As a result of such arrangement, the end loading on the rack or the side applied holding power is distributed over a larger surface area and thereby minimizes objectionable wear on the roller 45. The rack 19 is provided with a recess as at 49 and 50 to receive the roller 45 in the closed and open positions respectively of both the main valve and pilot valve discs. The notch 60 when engaged by the roller 45 holds the pilot valve disc 9 in the bleed or unseated position.

It will be apparent that the spring member 42 is preferably contained within the detent cover 38 and with the depth of the detent cover providing for predetermined end loading or compression of the said spring 42. The latter member will of course be variable with respect to the size and number of coils employed so as to increase or decrease the end or transverse thrust as it is applied by the roller member 45 against the rack 19 and in turn exerted against the rotatable pinion 27.

It will be also clear that since the roller 45 is in about the same vertical plane as the rack 19 constant and substantially full mesh of the teeth 26 on the rack with the teeth on the pinion 27 is provided in addition to the desirable guiding function furnished by the arms or extension 44. The structural advantage obtained is that under no operating conditions will twisting or objectionable distortion occur between the connected elements of the actuating means.

Previously, in valves of this type, close and costly tolerances have been provided between the gear and rack dimensions. In the instant design, the valve provides for convenient and economical self-alignment and clearances as at 51 on the bushing 20 provides for freedom of movement in substantially every direction of operation of the rack 19 without twisting or binding of the mechanism. Thus, when the main valve disc 6 is inserted in the liner 14, all of the valve parts are easily aligned because the rack 19 is of the so-called floating type as hereinabove described.

In the latter connection, it will also be clear that the structure of this invention possesses the advantage in that the rack 19 together with the main valve disc 3 and the pilot valve disc 9 can be easily removed from the valve as a unit or sub-assembly. When the rack shaft 29 is turned more than 90 degrees the rack teeth 26 disengage the teeth on the pinion 27 and upon the occurrence of such release the roller holder arms 44 with the cooperation of the spring 42 will contact the stem. The latter action thereby allows for a predetermined play or clearance being established between the roller 45 and the pinion 27. Therefore, it will be clear that to insert the rack 19, the stem is simply rotated to its other position and the teeth on the gear and pinion will engage the teeth on the rack. Operation of the valve then can be undertaken in the manner above referred to.

In the operation of the valve, it will be apparent that upon rotation of the transverse shaft or stem 29 in a clockwise direction when viewed in Fig. 1, the pilot valve 9 will be lifted from its seat contact as at 11 in the initial movement of the rack 19, until the shoulder 52 engages the lower surface 53 of the threaded bushing 20. The roller 45 at such stage of operation will engage the rack notch 60. Continued movement of the rack 19 upwardly will thereupon lift the main valve disc 6 from its seat contact as at 7 and thus the fluid flow will occur not only through the aperture 13 as provided by the initial movement of the pilot disc 9, but such fluid flow will be augmented by that which also occurs past the main valve annular seat 7.

In the movement of the valve in the opposite or closing direction, the main valve disc will contact as at seat 7 first, and continued movement of the rack 19 downwardly will cause the auxiliary or pilot disc to ultimately reach the seat contact 11. In each phase of operation, therefore, it will be understood that the main valve seating contact is thus protected to the extent that full flow through the valve is neither permitted nor stopped until the pilot valve disc 9 has reached its seat in the closing direction and has reached its shoulder portion as at 53 in the opening direction of the valve. This type of operation protects the main valve seat to a substantial degree and lends itself to longer life and improved performance even on severe services such as railroad steam lines and the like.

It will, of course, be apparent that only a preferred embodiment of the invention has been described, and the invention is capable of embodiment in a number of forms within the spirit of the appended claims.

We claim:

1. In a car end valve, the combination of a casing with a seat therein, the said casing having an inlet and an outlet with a flow passage therebetween, a main closure member and a pilot valve within said casing reciprocally movable relative to the said casing and being guided by the latter member, the said pilot valve communicating with said flow passage, a gear and a notched rack mechanism for actuating said closure member, a rotatable stem therefor cooperating with the said rack and gear, a gear cooperating with said stem and mounted to effect reciprocating movement of the said rack mechanism, detent means comprising roller and axle means engaging the notched portions of the said rack, a holder for the said axle and roller means mounted above said casing for limited axial movement relative to the said gear and rack and having joint means oppositely disposed for guiding the said gear and rack members and journally supporting the said roller means, the engagement by said roller means of one of said notched portions of the rack providing for predetermined movement of said pilot valve.

2. In a car end valve, the combination of a casing with a seat therein, the said casing having an inlet and an outlet with a flow passage therebetween, a main closure member and a pilot valve within said casing reciprocally movable relative to the said casing and being guided within the latter member, the said pilot valve communicating with said flow passage, a gear and a notched rack mechanism for actuating said closure member, a rotatable stem therefor cooperating with the said rack and gear, a gear cooperating with said stem and mounted to effect reciprocating movement of the said rack mechanism, transversely extending detent means comprising roller and axle means selectively engageable with the notched portions of the said rack, a bifurcated holder with arms for receiving the said roller and axle means mounted above said casing for limited axial movement relative to the said gear and rack and having oppositely disposed inner surfaces for slidably engaging side limits of the said gear and rack members and supporting the axle for said roller means, the selective engagement by said roller and axle means of one of said notched portions of the rack providing for predetermined movement of said pilot valve.

3. In a car end valve actuating mechanism, the combination of a casing with a seat therein, the said casing having an inlet and an outlet with a flow passage therebetween, a main closure member and a pilot valve closure member within said casing reciprocally movable relative to the said casing, the said pilot valve communicating with said flow passage, at least one of the said closure members being guided by the said casing, a gear and a pivotally movable notched rack mechanism for actuating said closure member, a rotatable stem therefor cooperating with the said rack and gear, a gear cooperating with said stem and mounted to effect reciprocating movement of the said rack mechanism, detent means comprising an axle with roller means thereon engaging the notched portions of the said rack, a resiliently supported holder for the said roller means mounted above said casing for limited axial movement transversely relative to the said gear and rack and having joint means spaced apart for guiding the said gear and rack members and journally supporting the axle for said roller means, the said pilot valve closure member being axially movable relative to the said main closure member, whereby the engagement by said roller means of one of said notched portions of the rack provides for predetermined axial movement of said pilot valve independently of said main closure member.

4. In a car end valve, the combination of a casing with a seat therein, the said casing having an inlet and an outlet with a flow passage therebetween, a main closure member and a pilot valve within said casing reciprocally movable relative to the said casing and being guided by the latter member, the said pilot valve communicating with said flow passage, a gear and a rack mechanism for actuating said closure member, the said rack mechanism being pivotally attached to said closure member and having a plurality of superposed notched portions, a rotatable stem transversely mounted to cooperate with the said rack and gear, the said gear cooperating with said stem and mounted to effect reciprocating movement of the said rack mechanism, detent means comprising an axle with roller means engaging the notched portions of the said rack, a holder for the said roller means having a cylindrical portion relatively loosely mounted above said casing and being limitedly movable transversely relative to the said gear and rack, the said holder having inwardly extending spaced apart parallel means for alignment simultaneously of said gear and rack members, the said holder rotatably supporting the said roller means between said inwardly extending means, the said rack and pilot valve being limitedly movable axially relative to the said main closure member whereby the engagement by said roller means with one of said superposed notched portions of the rack provides for predetermined positioning of said pilot valve after occurrence of axial movement of said pilot valve relative to the said main closure member.

5. In actuating means for a car end valve or the like, the combination of a casing with a seat therein, the said casing having an inlet and an outlet with a flow passage therebetween, a main closure member and a pilot valve within said casing reciprocally movable within the said casing communicating with the said flow passage, the said pilot valve being guided by the said main closure member and being movable relative to the said main closure member, a gear and a notched rack mechanism for actuating said closure member, a rotatable stem therefor cooperating with the said rack and gear, the said gear being mounted on the said stem to effect reciprocating movement of the said rack mechanism, the said rack mechanism being pivotally movable relative to the said pilot valve in a direction toward and away from said gear, detent means comprising an axle with roller means engaging the notched portions of the said rack, a holder for the said roller means resiliently mounted above said casing to permit limited axial movement of said holder in opposite directions relative to the said gear and rack, the said holder having oppositely disposed means for engaging the said gear and rack members to guide the latter members and also journally support the axle of said roller means, whereby the engagement by said roller means of one of said notched portions of the rack provides for predetermined axial positioning of said pilot valve.

6. In a valve actuating means, the combination of a casing with a seat therein, the said casing having an inlet and an outlet with a flow passage therebetween, a main valve closure member and a pilot valve closure member within said casing reciprocally movable relative to the said casing seat communicating with the said flow passage, at least one of said closure members being guided by the said casing, a gear and a notched rack mechanism for actuating said closure member, the said rack being pivotally mounted on and reciprocally movable with said pilot valve closure member, a rotatable shaft for actuating the said rack and gear, said gear engaging said rack to effect reciprocating movement of the said rack mechanism, limitedly movable detent means including an axle with roller means engaging the notched portions of the said rack, a holder for the said roller means mounted above said casing for limited axial movement relative to the axle of said gear and rack and having joint means oppositely disposed for guiding the said gear and rack members and journally supporting the axle of said roller means, the said rack being loosely mounted relative to the said main valve closure member to permit independent withdrawal with said pilot valve closure member, the engagement by said roller means of one of said notched portions of the rack providing for predetermined positioning of said main valve and pilot valve closure members.

7. In a valve actuating mechanism of the character described, the combination of a casing with a seat therein, the said casing having an inlet and an outlet with a flow passage therebetween, a main closure member and a pilot valve within said casing reciprocally movable relative to the said casing communicating with the said flow passage, a gear and a notched rack mechanism for actuating said closure member, a rotatable stem therefor cooperating with the said rack and gear, said gear cooperating with said stem and being mounted to effect reciprocating movement of the said rack mechanism, the said rack being connected to the said pilot valve, detent means comprising roller means engaging the notched portions of the said rack, a substantially bifurcated holder for the said roller means mounted for limited axial movement relative to the said gear and rack and having inner surfaces extending in a plane parallel to the direction of movement of the said rack and for receiving said roller means and guiding the said rack member in the same plane relative to the said gear, the said holder having means for supporting the said roller means to normally bear against the notched portion of the said rack whereby upon engagement of said roller means with one of said notched portions of the rack predetermined positioning of said main closure member and said pilot valve relative to the said casing is provided.

References Cited in the file of this patent

UNITED STATES PATENTS

| | | |
|---|---|---|
| 1,960,831 | Shand | May 29, 1934 |
| 2,033,785 | Rice | Mar. 10, 1936 |
| 2,329,182 | Boynton | Sept. 14, 1943 |
| 2,406,727 | Wetherbee | Aug. 27, 1946 |
| 2,639,729 | Tulumello | May 26, 1953 |
| 2,693,825 | Carr | Nov. 9, 1954 |